United States Patent [19]
Kawai et al.

[11] Patent Number: 6,043,866
[45] Date of Patent: *Mar. 28, 2000

[54] CARRIER SHEET AND ORIGINAL READING APPARATUS

[75] Inventors: Tsutomu Kawai, Yokohama; Shinya Asano, Tokyo; Hiroshi Nakai, Yokohama; Hiroyuki Tanaka, Kawasaki, all of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/801,817

[22] Filed: Feb. 14, 1997

[30] Foreign Application Priority Data

Feb. 20, 1996 [JP] Japan ................................ 8-032144
Nov. 29, 1996 [JP] Japan ................................ 8-319515

[51] Int. Cl.⁷ ................................ B65H 7/02; B42F 1/06
[52] U.S. Cl. ................................ 355/77; 399/378; 40/777; 40/772; 40/773; 40/415.1; 402/6; 402/47
[58] Field of Search ................................ 40/771–778, 794; 101/415.1; 206/472, 474, 728; 355/72, 74, 75, 76; 399/377, 378; 402/80 P, 500, 501, 46, 47, 6; 493/952

[56] References Cited

U.S. PATENT DOCUMENTS

| | | | |
|---|---|---|---|
| 4,486,032 | 12/1984 | Leahy | 281/46 |
| 5,114,139 | 5/1992 | Kodama | 271/265 |
| 5,123,191 | 6/1992 | Kim | 206/474 |
| 5,152,492 | 10/1992 | Foisy | 248/488 |
| 5,226,996 | 7/1993 | Schober | 156/226 |
| 5,242,522 | 9/1993 | Moir | 156/243 |
| 5,267,898 | 12/1993 | Doll et al. | 462/6 |
| 5,337,949 | 8/1994 | Seeley | 229/92.8 |
| 5,433,023 | 7/1995 | Edwards et al. | 40/159.1 |
| 5,620,271 | 4/1997 | Bergh et al. | 402/80 P |

*Primary Examiner*—David M. Gray
*Assistant Examiner*—Michael Dalakis
*Attorney, Agent, or Firm*—Fitzpatrick, Cella, Harper & Scinto

[57] ABSTRACT

This specification discloses a carrier sheet for original having an upper sheet and a lower sheet, the two sheets having their leading end portions as viewed in the direction of advance of the original adhesively secured to each other in the widthwise direction thereof, and adapted to be opened to set the original and to be closed to hold the original therebetween, characterized by the provision of original keeping means for preventing the deviation of the original held by the carrier sheet.

10 Claims, 18 Drawing Sheets

CARRIER SHEET AND ORIGINAL READING APPARATUS

BACKGROUND OF THE INVENTION

1. Field of the Invention

This invention relates to a carrier sheet and an original reading apparatus and particularly to a carrier sheet for original feeding used in an original reading apparatus such as a scanner of the sheet-through type or a facsimile apparatus to hold an original, for example, between a lower sheet and a transparent upper sheet, and an original feeding device.

2. Related Background Art

A carrier sheet according to the prior art, as shown in FIG. 21 of the accompanying drawings, has an opaque lower sheet 1 and a transparent upper sheet 2 both made of plastic or like material, and these upper and lower sheets have had their leading end portions in the direction of advance of an original adhesively secured to each other as by welding. In this manner, a thin string-like adhesively secured portion 3 has been formed on the leading end portion of the carrier sheet. The thus constructed carrier sheet is inserted from the leading end thereof in the direction of advance of an original G, i.e., the adhesive securing margin side, into a reading apparatus such as a scanner with the original G sandwiched between the lower sheet 1 and the upper sheet 2, and the reading of the original is effected.

However, the prior-art carrier sheet shown in FIG. 21 has suffered from the following disadvantages when reading is effected by a serial scanner. When an original of thick paper such as a postcard with a photograph held by and between a drive roller 11 and a pinch roller 12 is to be conveyed, the upper sheet 2 and the lower sheet 1 deviate relative to each other to thereby create a level difference in the shape of the thick paper, as shown in FIG. 22 of the accompanying drawings, and in the case of a printer in which the diameters of the drive roller 11 and pinch roller 12 are small, the level difference portion did not nip into the roller and the original could sometimes not be conveyed while slipping.

Also, when the conveying operation further continues with the original slipping, only the upper sheet 2 lying on the drive roller 11 side on which the conveying force works may be fed much as shown in FIG. 23 of the accompanying drawings, and the carrier sheet has rubbed against a scanner head 21 to thereby cause bad conveyance. Further, by the upper sheet 2 and the lower sheet 1 deviating relative to each other, an air layer has been formed between the original and the sheet to bring about a slippery state, and the thick paper such as the postcard with a photograph so that the carrier sheet has deviated relative to each other. Thus, only the carrier sheet has been conveyed and the thick paper such as the postcard with a photograph has not been conveyed with the aforementioned level difference portion being not bitten by the rollers. Therefore, originals which can be conveyed have been limited to a certain degree.

Also, when the carrier sheet is held by and between the drive roller 11 and the pinch roller 12, the amount of conveyance on the drive roller 11 side is greater than that of the pinch roller 12 side. Therefore, the upper sheet 2 and lower sheet 1 of the carrier sheet deviate relative to each other and become downwardly curved as shown in FIG. 24 of the accompanying drawings, and the original reading distance from the scanner head 21 is liable to change or bad conveyance is liable to occur.

SUMMARY OF THE INVENTION

The present invention has been made in view of the above-noted disadvantages peculiar to the prior art and has the object to provide a carrier sheet capable of conveying thick paper.

The present invention is featured by the provision of original keep means for preventing the deviation of an original held by the carrier sheet.

Also, according to the present invention, to keep an original, the upper sheet and lower sheet of the carrier sheet are adhesively secured to each other as follows. A side corresponding to the leading end portion as viewed in the direction of sheet feeding is adhesively secured, and a plurality of branches are adhesively secured to the adhesively secured portion by an adhesively securing portion of a length L which will be described later. The interval between the branch-like adhesively secured portions is made smaller than the width of an original of a prescribed size and made greater than the width of an original of thick paper such as a postcard. The rear ends of at least two branch-like adhesively secured portions are set equidistantly from the adhesively secured portion at the leading end.

Also, according to the present invention, to feeding the original, at least one stopper portion for preventing the deviation of the original is provided on one of said sheets.

Also, to feeding the original, the lower sheet and the upper sheet can be made substantially integral with each other temporarily during the use of the carrier to thereby achieve the above object.

By this construction, when a relatively thick original such as a postcard with a photograph is to be conveyed while being held by the carrier sheet, the slip and non-conveyance of the carrier sheet and a roller due to a level difference created on the leading end side of the original, the conveyance of only the sheet on one side by a drive roller, and the conveyance or the like of only the carrier sheet by the slip of the original and the upper and lower sheets can be prevented. Thus, the kinds of originals which can be conveyed are increased.

As described above, according to the present invention, the deviation between a thick original and the sheet which is liable to occur during the inrush of the leading end portion of the original into the roller is eliminated and bad sheet feeding resulting therefrom can be prevented.

Also, the conveying force from the drive roller can be directly transmitted to the original through the sheet and the nipping property of the leading end portion of the thick original into the roller can be improved and the original reading in an original reading apparatus can be made smooth, and also the kinds of originals which can be conveyed can be increased.

Also, as described above, the carrier sheet according to the present invention has its upper and lower sheets adhesively secured to each other by a plurality of adhesively secured portions substantially in the direction of advance of the original or an adhesively secured portion added substantially orthogonally to the adhesively secured portions. Therefore, the leading end portion of the carrier sheet is reinforced so that problems such as the fluctuation of the original reading distance during original reading and the impossibility of paper feeding due to the creation of a level difference portion are eliminated, and the original reading in an original reading apparatus can be effected smoothy with good accuracy.

DESCRIPTION OF THE PREFERRED EMBODIMENTS

[Embodiment 1]

An embodiment of a carrier sheet according to the present invention will hereinafter be described with reference to FIG. 1.

Figure 1:
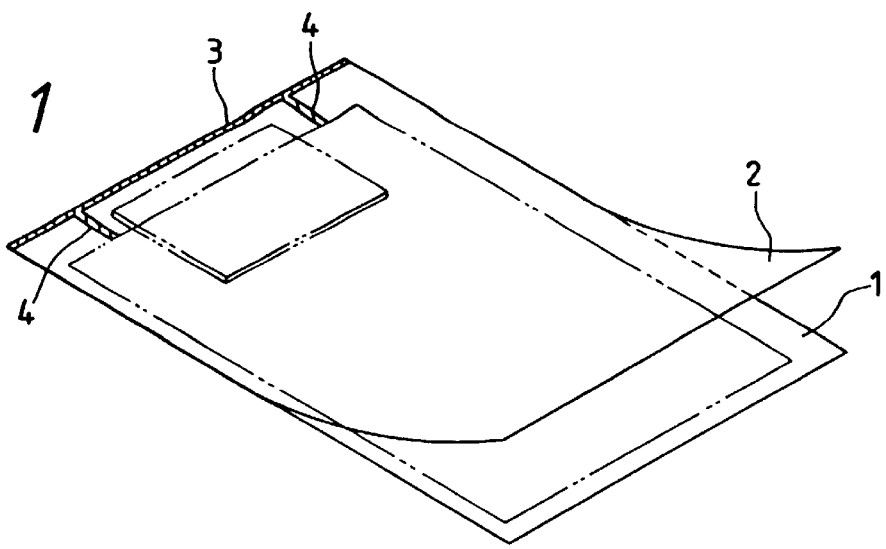
FIG. 1 is a pictorial view of Embodiment 1 of a carrier sheet according to the present invention.
Figure 3:
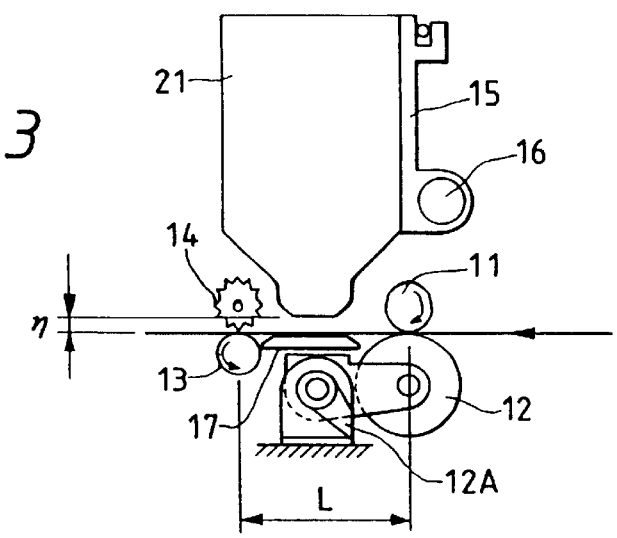
FIG. 3 is a schematic view of a serial scanner as it is seen from its side.

In FIG. 1, the reference numeral 1 designates a lower sheet which may preferably be opaque, and the reference numeral 2 denotes an upper sheet which is transparent, and these sheets may preferably be plastic sheets. The lower sheet 1 and the upper sheet 2 have their leading end portions as viewed in the direction of advance of an original secured to each other as by welding and has a thin string-like adhesively secured portion 3 formed there. The width of the adhesively secured portion may preferably be about 5 mm or less. Also, in the present embodiment, the lower sheet and the upper sheet are adhesively secured to each other as by welding in thin string-like adhesively secured portions 4 substantially perpendicular to the adhesively secured portion 3. A plurality of adhesively secured portions 4 extend in the form of branches, and at least two of them are of the same length which is of the order of the longitudinal distance L of a roller as shown in FIG. 3, and these adhesively secured portions 4 represent the feature of the present invention best. The carrier sheet as described above holds an original G between the upper and lower sheets and is inserted into a scanner or the like. An example of such scanner will now be described.

Figure 4:
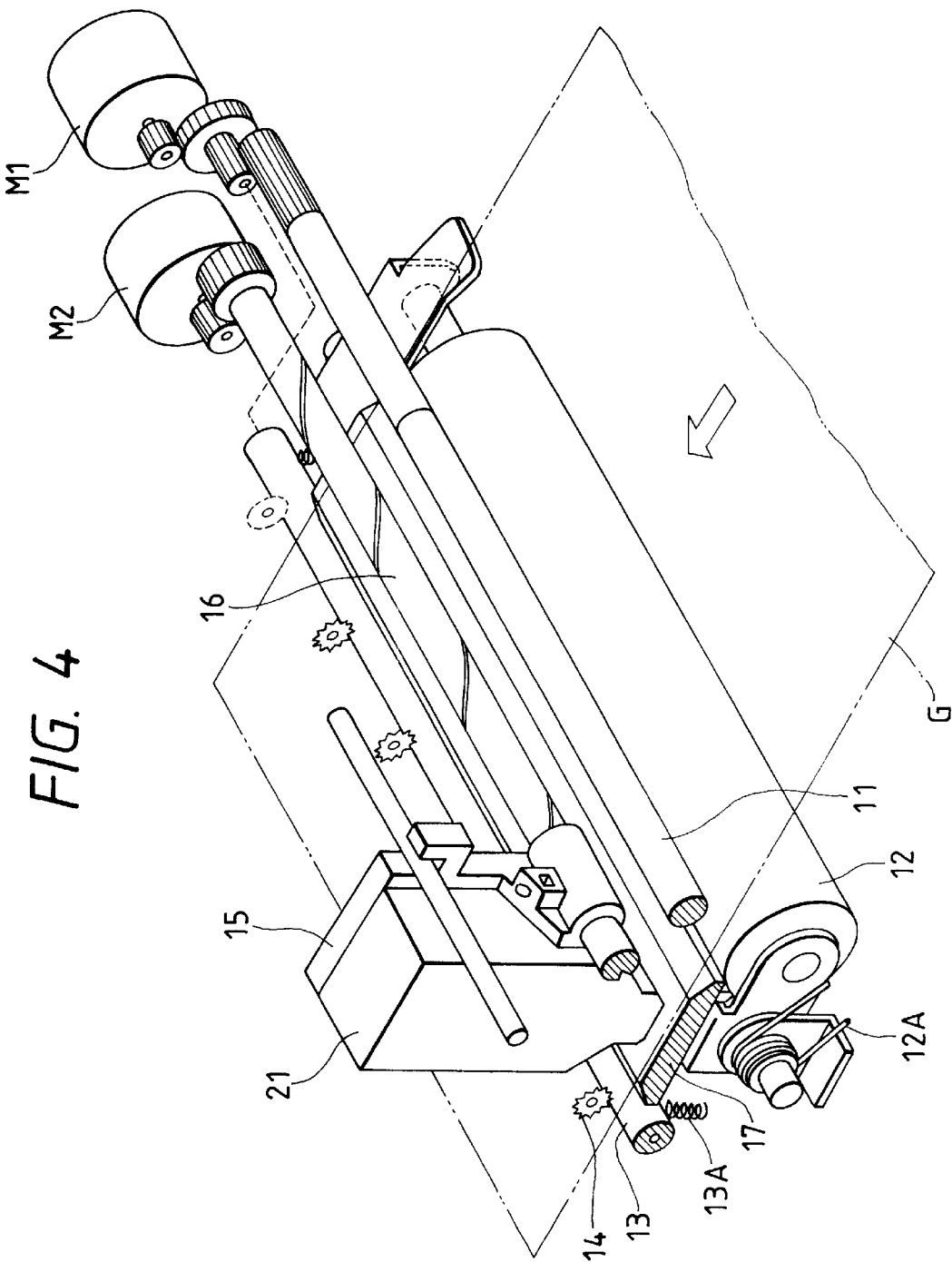
FIG. 4 is a pictorial view showing the structure of the serial scanner.

FIG. 3 is a schematic view of a serial scanner, and FIG. 4 is a pictorial view of the scanner.

In FIGS. 3 and 4, the reference numeral 11 designates a drive roller rotated by a motor M1, the reference numeral 12 denotes a pinch roller biased by a spring 12A, the reference numeral 13 designates a paper discharging roller biased by a spring 13A, and the reference numeral 14 denotes a spur. The reference numeral 15 designates a carriage which is guided by a guide bar roller 12 and driven by a lead screw 16 rotated by a motor M2 and reciprocally moved in a direction orthogonal to the direction of movement of the original. The reading of the original is effected by a scanner head 21 supported by the carriage 15. The centers of rotation of the rollers 12 and 13 are movable in a direction substantially orthogonal to the plane of movement of the original, and these rollers are urged against the rollers 11 and 14 having their centers of rotation fixed. Therefore, the original reading distance η is constant irrespectively of the thickness of the original.

Figure 23:
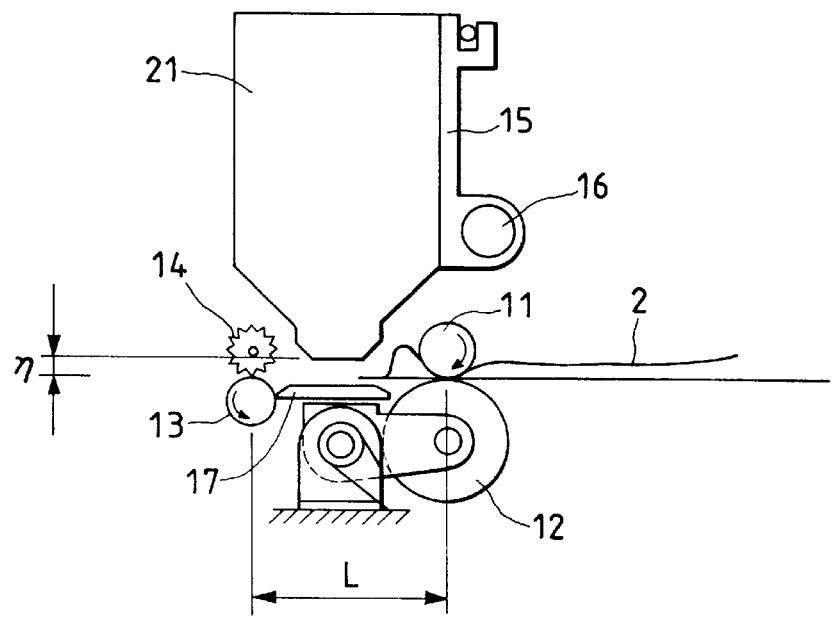
FIG. 23 is a schematic view of the prior art when a carrier sheet is supplied to a serial scanner.
Figure 24:
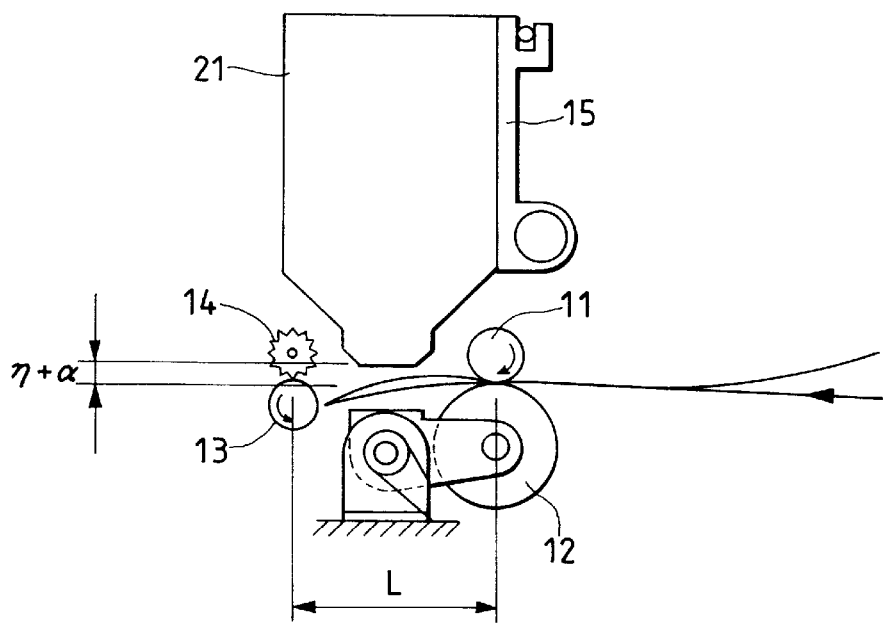
FIG. 24 is a schematic view of the prior art when an original is held by the serial scanner.

When the carrier sheet is used, since an amount corresponding to the thickness of the sheet 2 is added to the original reading distance η, to effect reading accurately, the sheet 2 must be made as thin as possible. Consequently, the sheet 2 is weak in rigidity. However, according to the present embodiment, the adhesively secured portions 4 are provided, whereby the rigidity of the vicinity of the leading end of the carrier sheet is increased and the deviation between the lower sheet 1 and the upper sheet 2 becomes null. Thus, the phenomenon as previously described in connection with FIG. 23 or 24, i.e., the downward deviation of the carrier sheet as shown in FIG. 24 or the deviation of the upper sheet and the lower sheet as shown in FIG. 23 which causes a level difference which in turn leads to the bad feeding of paper, can be prevented.

[Embodiment 2]

A second embodiment of the present invention will now be described.

The difference of the present embodiment from the aforedescribed Embodiment 1 is that a thin string-like adhesively secured portion 6 is added to the adhesively secured portions 4 which chiefly reinforces a dashing portion for an original of a prescribed size. This adhesively secured portion 6 may preferably have a width of about 5 mm or less, and the length thereof is greater than the width and of a degree which does not hamper the holding of an original of a size smaller than a prescribed size. Also, the adhesively secured portion 5 extends in a direction substantially orthogonal to the adhesively secured portions 4 and can be provided in the other portion than the leading ends of the adhesively secured portions 4 and can be plural.

According to the present embodiment, the strength of adhesion is more improved for the load separating the lower sheet 1 and the upper sheet 2 from each other than in the aforedescribed embodiment, and an effect similar to that of the aforedescribed embodiment can be obtained.

[Third Embodiment]

A third embodiment of the carrier sheet according to the present invention will now be described with reference to FIGS. 5 to 8.

Figure 5:
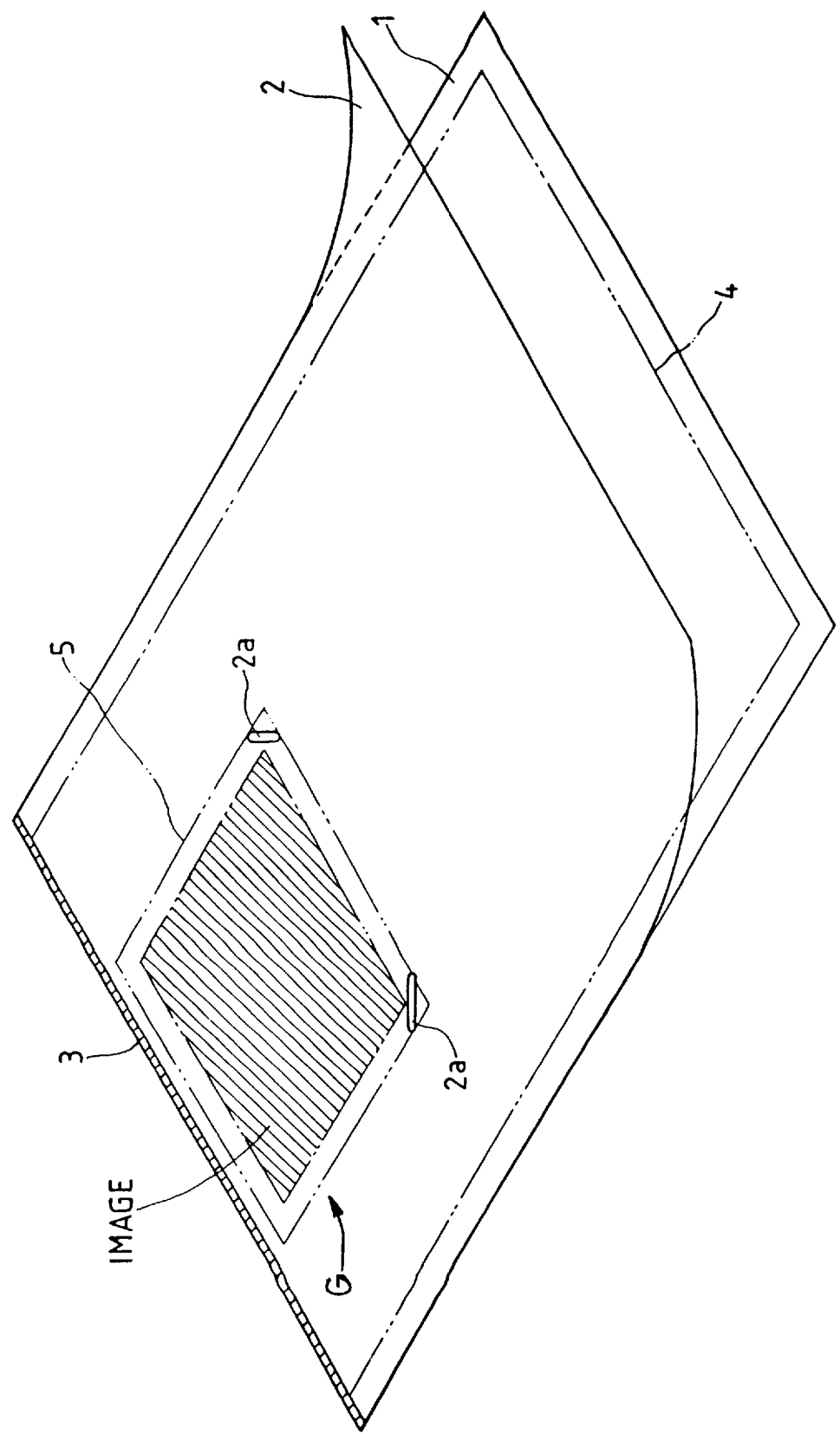
FIG. 5 is a pictorial perspective view for illustrating a carrier sheet according to a third embodiment.

In FIG. 5, the reference numeral 1 designates an opaque (e.g. cloudy) lower sheet, and the reference numeral 2 denotes a transparent upper sheet, and these sheets may desirably be formed of a plastic sheet material. The lower sheet 1 and the upper sheet 2 have their leading end portions as viewed in the direction of advance of an original adhesively secured to each other as by welding, and a thin string-like adhesively secured portion 3 is formed there. The width of the adhesively secured portion 3 may preferably be of the order of 5 mm or less. The carrier sheet holds an original G between the upper and lower sheets and is inserted into an original reading apparatus such as a scanner.

Figure 2:
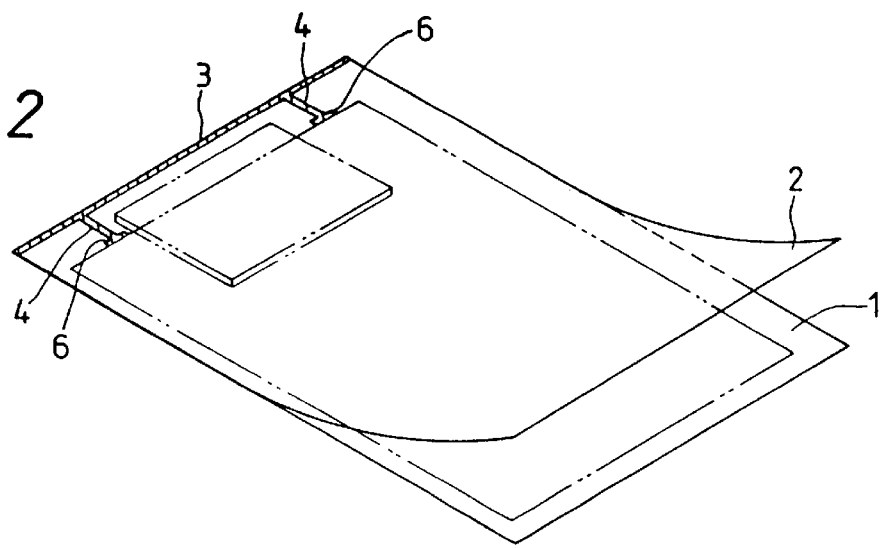
FIG. 2 is a pictorial view of Embodiment 2 of the carrier sheet according to the present invention.
Figure 6:
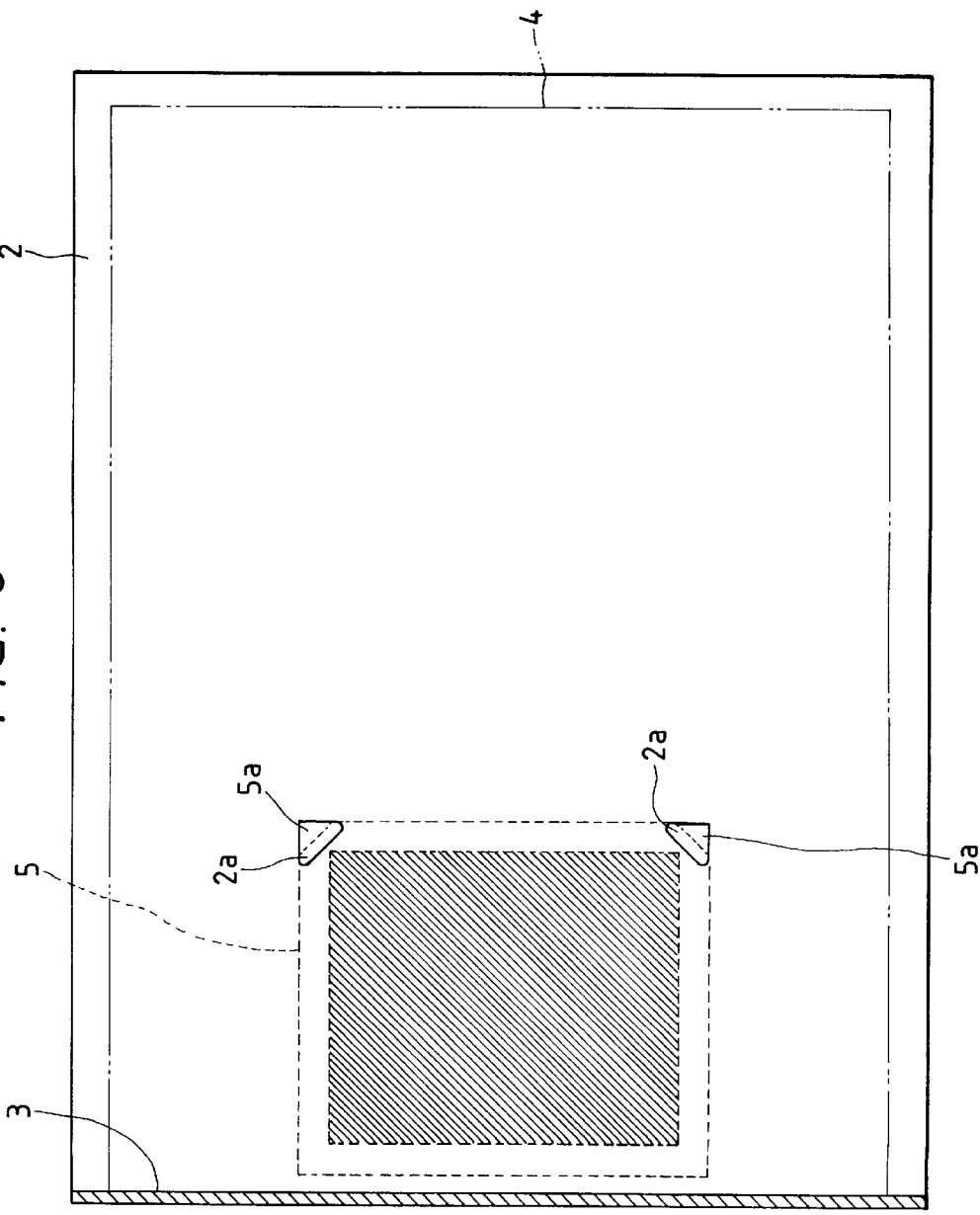
FIG. 6 is a plan view for illustrating the carrier sheet according to the third embodiment.
Figure 7:
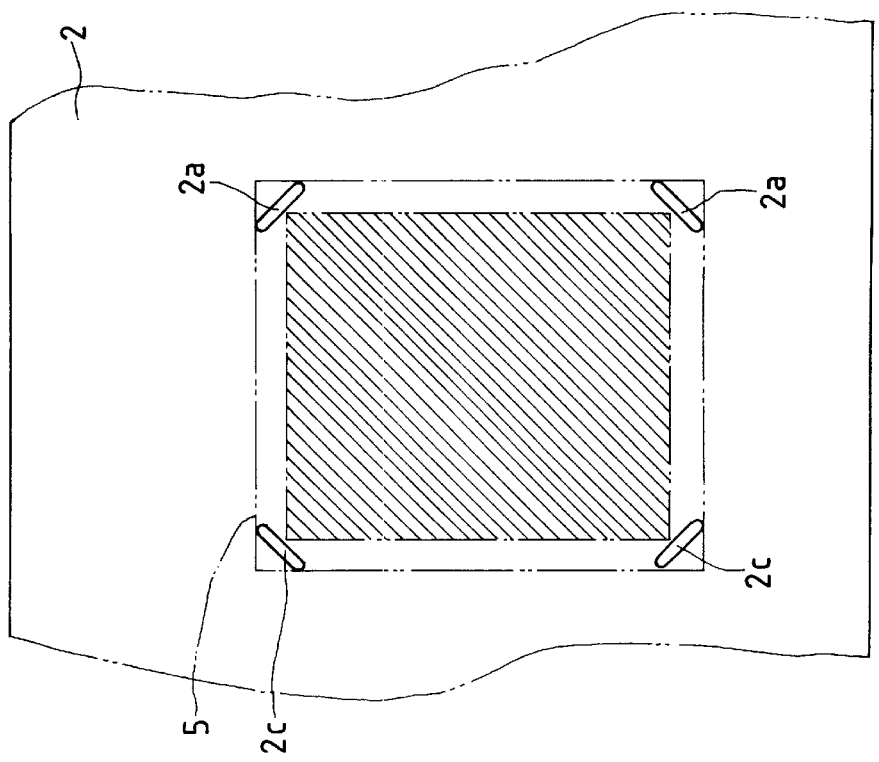
FIG. 7 is a fragmentary plan view for illustrating a modification of the carrier sheet according to the third embodiment.
Figure 8:
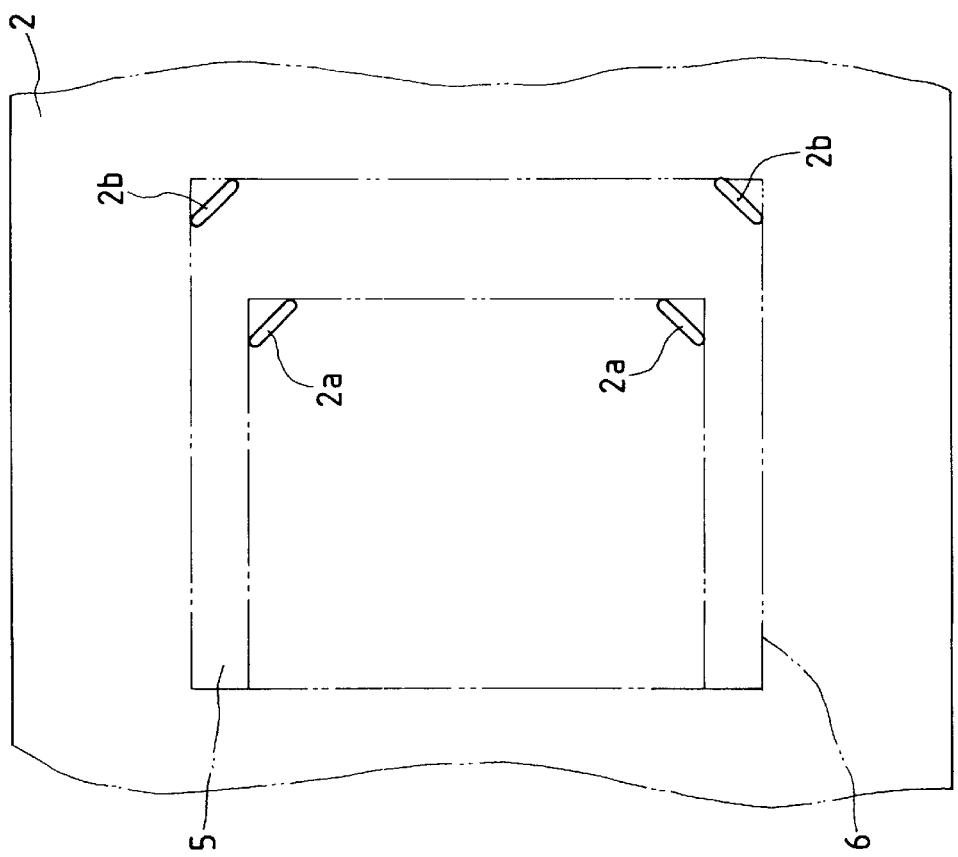
FIG. 8 is a fragmentary plan view for illustrating another modification of the carrier sheet according to the third embodiment.
Figure 22:
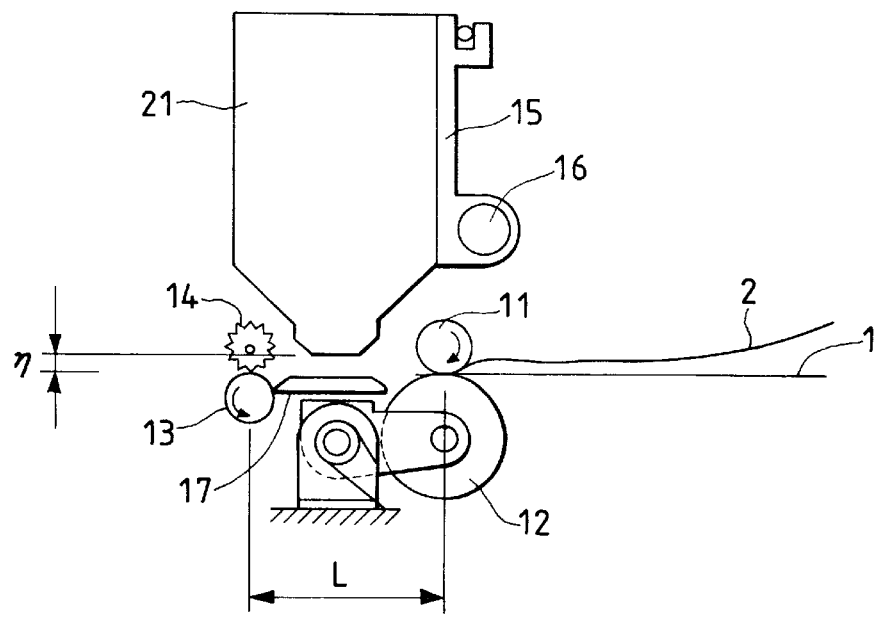
FIG. 22 is a schematic cross-sectional view for illustrating one of the inconveniences of the prior art.

In the present embodiment, the upper sheet 2 is provided with apertured portions 2a (or slit-like cutouts) into which the corner portions of a relatively thick original such as a postcard with a photograph are inserted, which provide stopper portions for preventing the deviation between the original and the carrier sheet. In FIG. 6, broken line 5 indicates thick paper 5 (original) such as a postcard with a photograph held in the carrier sheet, and it is under the upper sheet 2. In the upper sheet 2 near the two corner portions 5a thereof rearward as viewed in the direction of conveyance of the thick paper 5 such as a postcard with a photograph, there are provided two apertured portions 2a inclined at 45°. When the thick paper 5 such as a postcard with a photograph is to be conveyed, the corner portions 5a are inserted into the apertured portions 2a to thereby set the thick paper in the carrier sheet. Here, the apertured portions of the upper sheet 2 can have their shape suitably determined in accordance with an original, and may be provided in a plurality such as 2a and 2b for originals 5 and 6 of different sizes, as shown in FIG. 7, or 2a (the rear end side) and 2c (the leading end side) into which the four corners of an original may be inserted may be provided as shown in FIG. 8, other various combinations are possible. Thus, the thick paper 5 such as a postcard with a photograph will not deviate on the carrier sheet rearwardly in the direction of conveyance or laterally, nor will the thick papers be inclined. Also, since the apertured portions 2a are provided in the upper sheet 2 on the drive roller 11 side, the conveying force transmitted to the upper sheet 2 is also directly transmitted to the thick paper 5 such as a postcard with a photograph. Therefore, the inconvenience as shown in FIGS. 22 to 24 does not occur, and the nipping property of the leading end of the thick paper 5 such as a postcard with a photograph into the roller is improved and the kinds of originals which can be conveyed can be increased.

[Fourth Embodiment]

Figure 9:
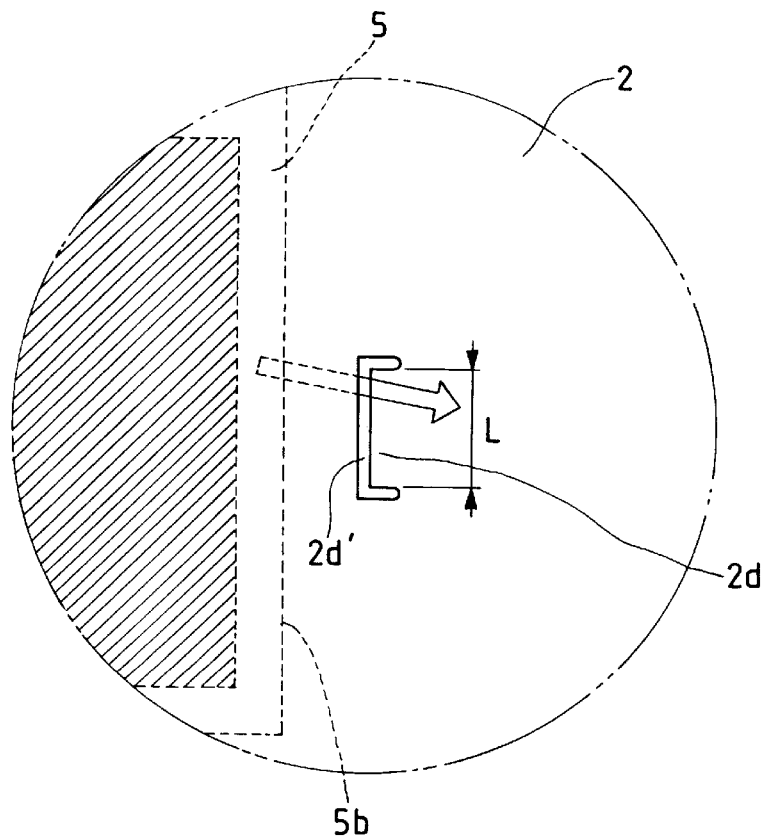
FIG. 9 is a fragmentary plan view for illustrating the state before an original is set by a carrier sheet according to a fourth embodiment.
Figure 10:
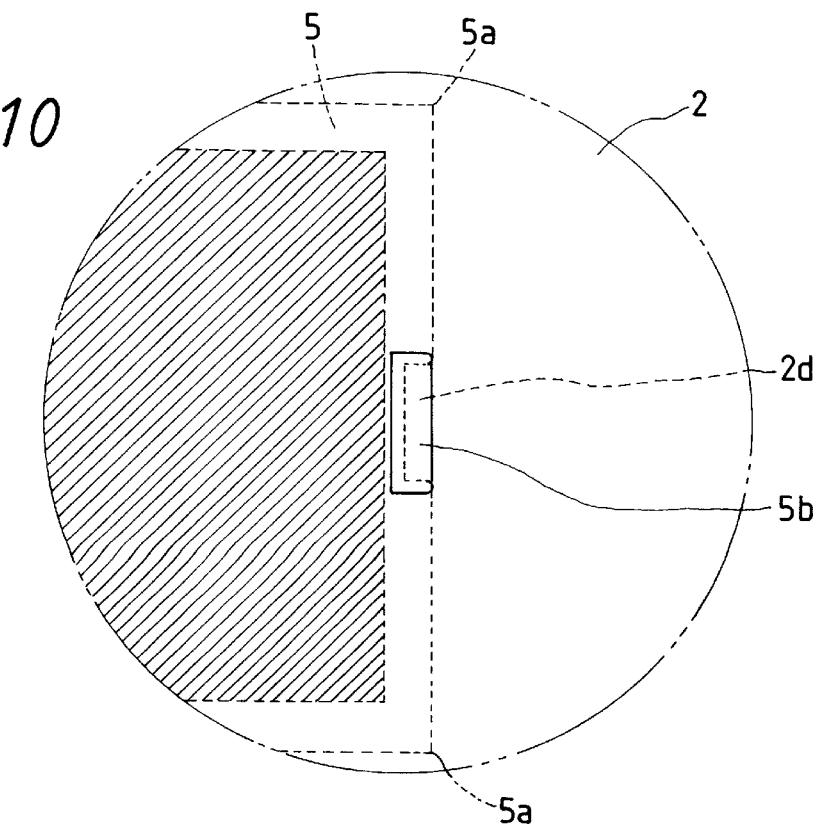
FIG. 10 is a fragmentary plan view for illustrating the state after the original is set by the carrier sheet according to the fourth embodiment.

A fourth embodiment of the carrier sheet according to the present invention will now be described with reference to FIGS. 9 to 11. However, the scanner apparatus, the carrier sheet, etc. which duplicate the first embodiment and have the same reference numerals as those in the first embodiment need not be described.

Figure 11:
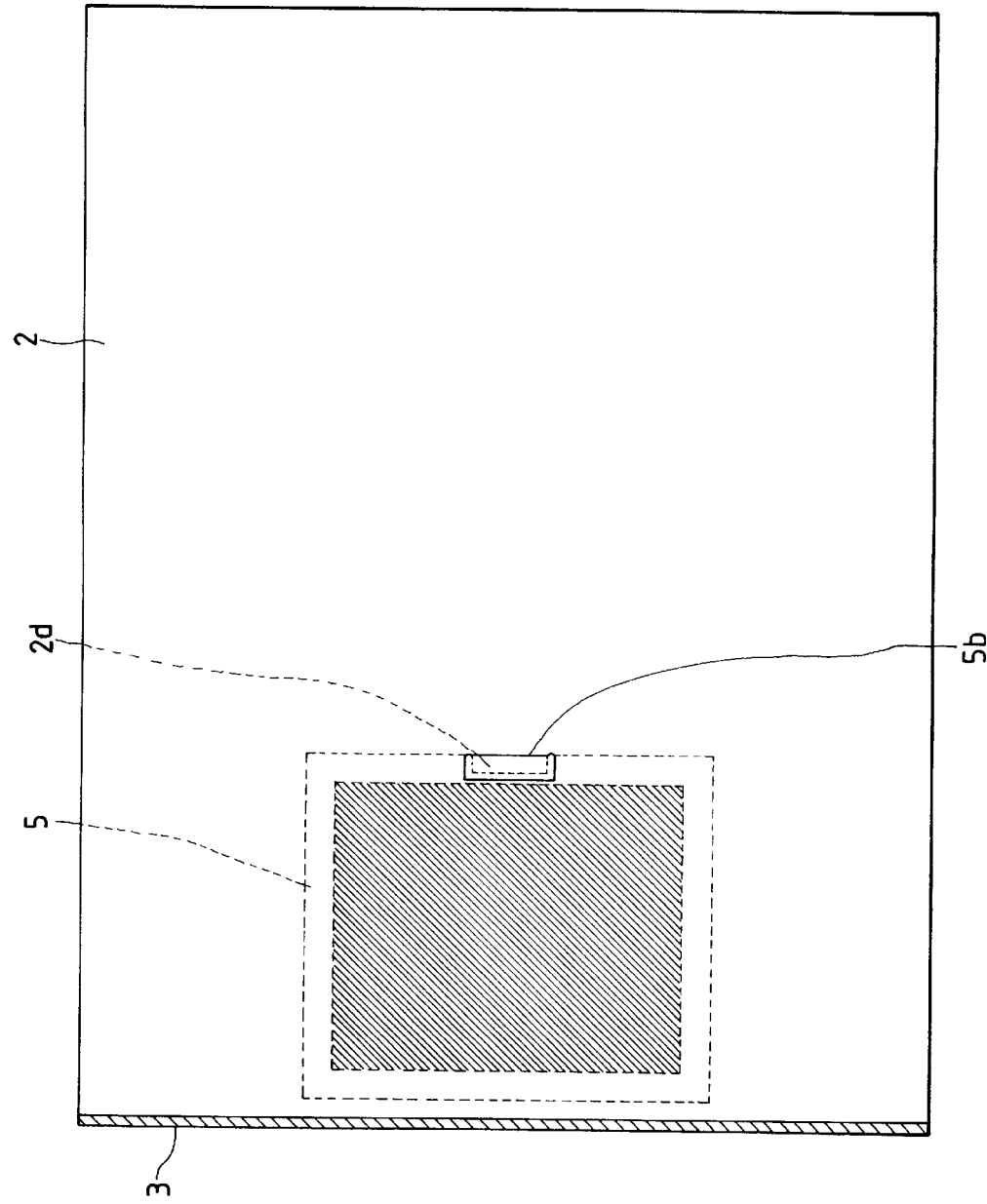
FIG. 11 is a plan view for illustrating a carrier sheet according to the fourth embodiment.

FIG. 11 shows the carrier sheet on the upper sheet 2 of which is provided a holding portion 2d which holds so as to nip substantially the central portion 5b of the rear side of thick paper 5 such as a postcard with a photograph as viewed in the direction of conveyance laid under the upper sheet 2 and indicated by a broken line, and which provides a stopper portion for preventing the deviation between the original and the carrier sheet. FIGS. 9 and 10 are enlarged plan views of the vicinity of the holding portion 2d, and the holding portion 2d is formed by providing a U-shaped aperture or slit 2d' in the upper sheet 2. The thick paper 5 such as a postcard with a photograph can be set by pushing the holding portion 2b a little downwardly, as shown in FIG. 9, and sliding the thick paper from under the upper sheet 2 so that the substantially central portion 5b of the rear side as viewed in the direction of conveyance may overlie the holding portion 2d to thereby bring about a plate as shown in FIG. 10. Also, to improve the holding force and holding stability of the holding portion 2d for the thick paper 5 such as a postcard with a photograph, a method of setting the width L of the root of the holding portion 2d to a great value, providing the holding portion 2d at a plurality of locations relative to a side (e.g. at two locations toward the two corner portions 5a) or providing the holding portion 2d on each of a plurality of sides can be simply carried out. Further, while the shape of the holding portion 2d has been described as a U-shape, it can suitably be set to a triangle or a semicircular shape or the like, and various kinds of settings of the holding portion 2d including the sizes, the installed positions and the number thereof are possible.

Thereby, the deviation of the thick paper 5 such as a postcard with a photograph on the carrier sheet in the rearward direction as viewed in the direction of conveyance or in the lateral direction, and the inclination or the like thereof can be prevented. Also, since the apertured portion is provided in the upper sheet 2 on the drive roller 11 side, the conveying force transmitted to the upper sheet 2 is also directly transmitted to the thick paper 5 such as a postcard with a photograph, so the inconveniences as shown in FIGS. 22 to 24 do not occur. Thus the nipping property of the leading end portion of the thick paper 5 such as a postcard with a photograph into the roller is also improved, and the kinds of originals which can be conveyed can be increased.

In the above-described embodiments, the apertured portions 2a, 2b, 2c and the holding portion 2d which provide the stopper portions for preventing the deviation between the original and the carrier sheet have been described as being provided in the upper sheet 2 of the carrier sheet, and this is because the drive roller of the scanner apparatus shown as an example is located on the upper side of the carrier sheet. Consequently, if the present invention is used in an apparatus wherein the drive roller is on the lower side of the carrier sheet, the construction of the present embodiment can be provided on the lower sheet 1 to thereby obtain a similar effect. Also, in order to make either apparatus usable, the construction of the present embodiment may of course be provided on both of the lower sheet 1 and the upper sheet 2. Further, the stopper portions are described as being formed integrally with the upper and lower sheets, but alternatively, a discrete member, for example, a tacky layer which can be repetitively stuck and stripped may be provided on the sheet side.

Figure 12:
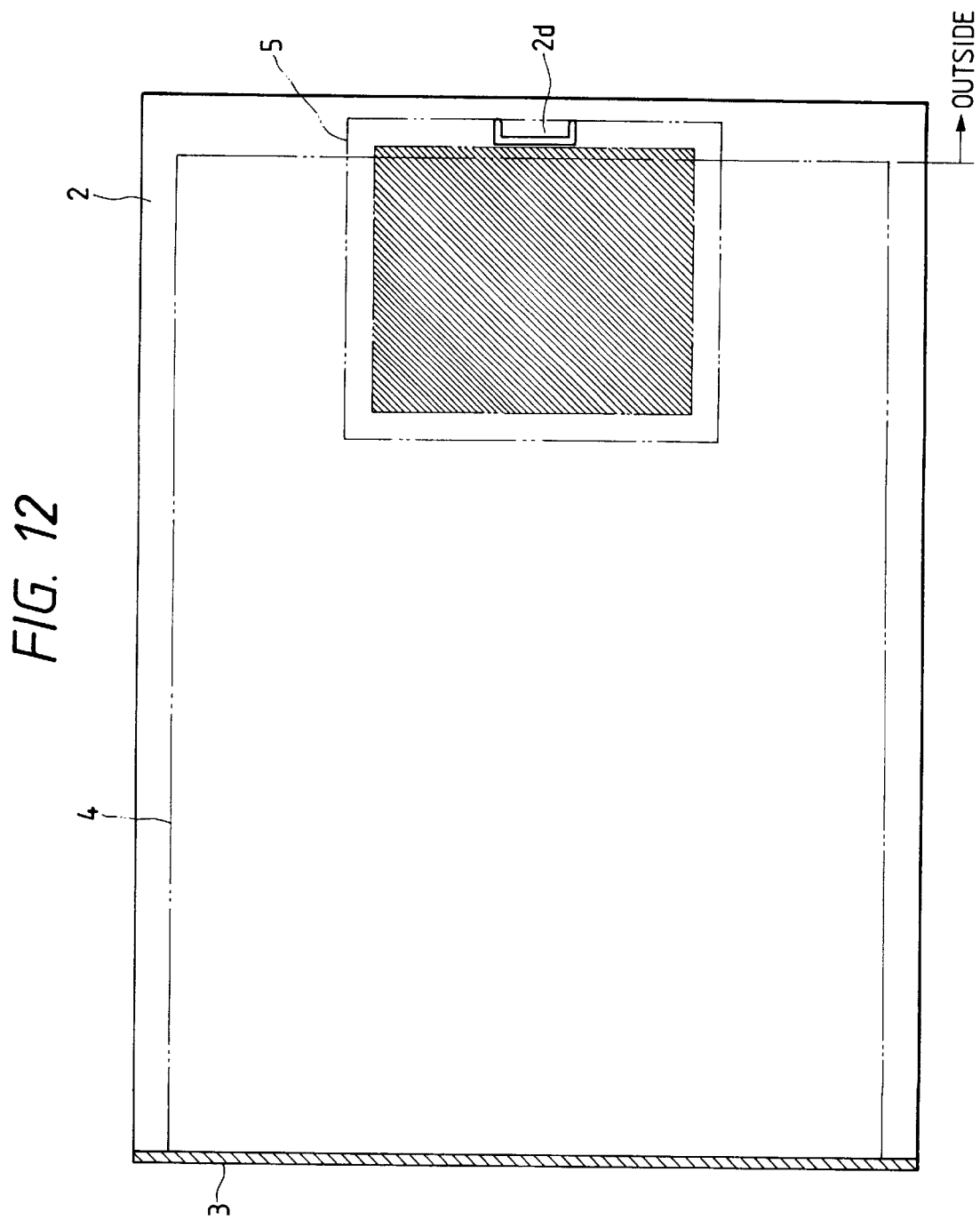
FIG. 12 is a plan view for illustrating a modification of the carrier sheet according to the fourth embodiment.

Also, in a case where the apertured portions and holding portion which provide the stopper portions for preventing the deviation between the original and the carrier sheet are provided in the upper sheet 2, when the original is read by a scanner apparatus of high performance, the shadows of the apertured portions and holding portion may sometimes appear in the image. To avoid this, the installed position of the holding portion 2d (as well as the apertured portions) may be in the image portion of an original 4 (dots-and-dash line) of a maximum size supposed or outside the original itself, as shown in FIG. 12.

As described above, according to the third and fourth embodiments of the present invention, stopper portions for preventing the slippage of a relatively thick original such as a postcard with a photograph and the carrier sheet are provided on the drive roller side on the upper and lower sheets forming the carrier sheet. Thus, the deviation between the original and the sheet which is liable to occur when the leading end portion of the thick paper original rushes into the roller is eliminated and the bad paper feeding resulting therefrom is prevented, and the conveying force from the drive roller can be directly transmitted to the original through the sheet, so that the nipping property of the leading end portion of the thick paper original into the roller can be improved and the original reading in the original reading apparatus can be made smooth, and the kinds of originals which can be conveyed can be increased.

[Fifth Embodiment]

A fifth embodiment of the carrier sheet according to the present invention will now be described with reference to FIGS. 13 to 17.

Figure 13:
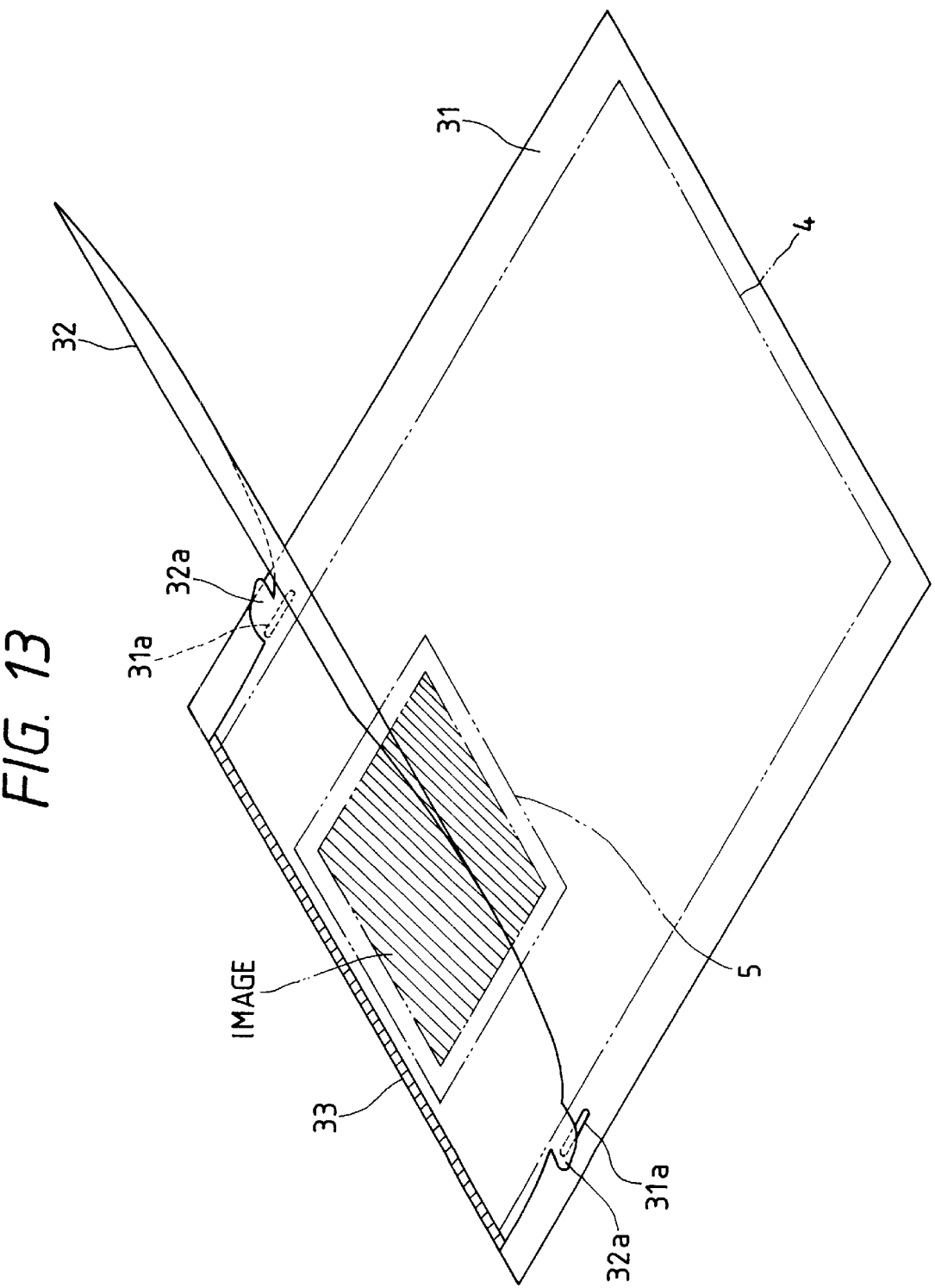
FIG. 13 is a pictorial perspective view for illustrating a carrier sheet according to a fifth embodiment.

In FIG. 13, the reference numeral 31 designates an opaque (e.g. cloudy) lower sheet, and the reference numeral 32 denotes a transparent upper sheet, and these sheets may preferably be formed of a plastic sheet material. The lower sheet 31 and the upper sheet 32 have their leading end portions as viewed in the direction of advance thereof adhesively secured to each other as by welding, and a thin string-like adhesively secured portion 33 is formed. The width of this adhesively secured portion 33 may preferably be of the order of 5 mm or less. The carrier sheet holds an original G between its upper and lower sheets, and is inserted into an original reading apparatus such as a scanner.

Figure 14:
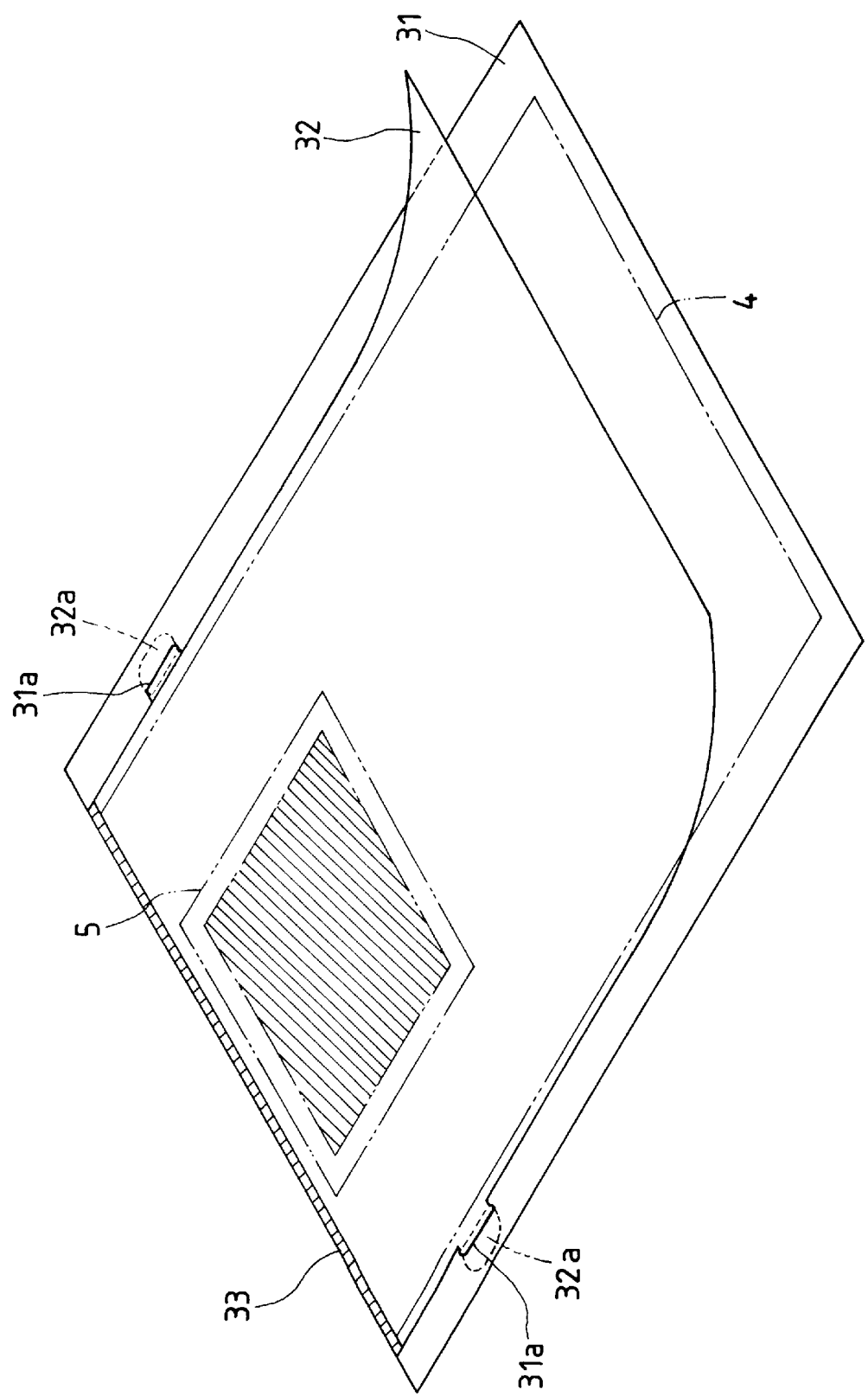
FIG. 14 is a pictorial perspective view for illustrating the state after the carrier sheet according to the fifth embodiment is set.
Figure 15:
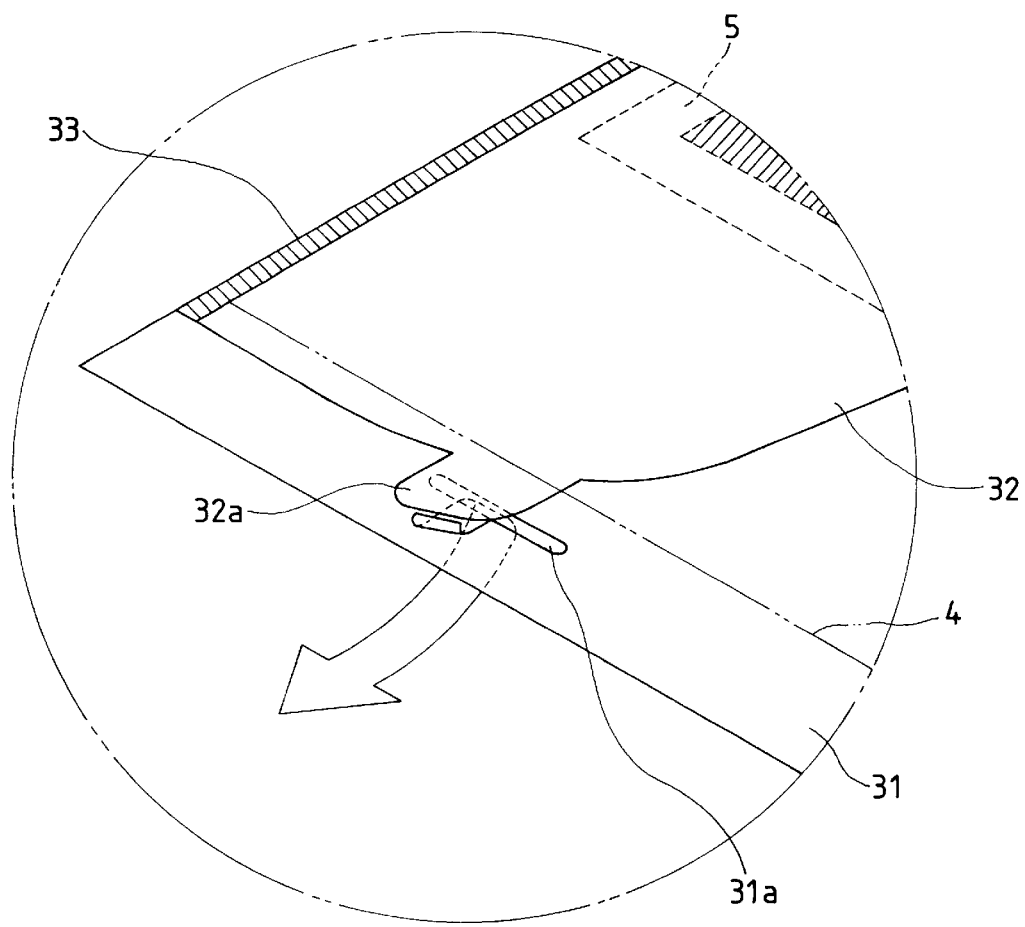
FIG. 15 is a fragmentary perspective view for illustrating the state when a thick paper original is set by the carrier sheet according to the fifth embodiment.
Figure 16:
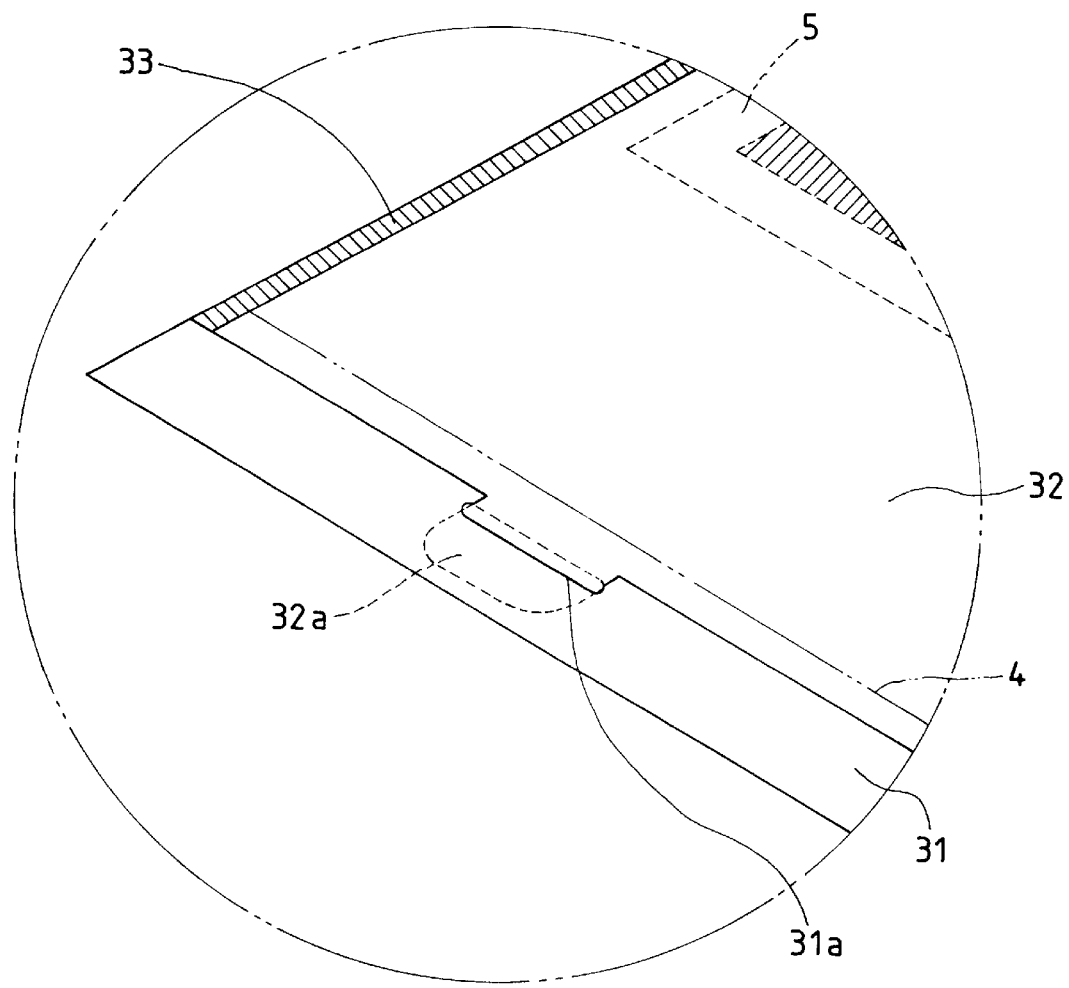
FIG. 16 is a fragmentary perspective view for illustrating the state when a thick paper original is set by the carrier sheet according to the fifth embodiment.

Consequently, in the present embodiment, restraining portions (31a and 32a) for temporarily making the lower sheet 31 and the upper sheet 32 integral with each other are provided outside the placement area for an original 4 (dots-and-dash line) of a maximum size supposed at the right and left side of a position at which thick paper 5 such as a postcard with a photograph (original) indicated by dots-and-dash line is placed as viewed in the direction of conveyance, as shown in FIGS. 13 and 14. The restraining portions are comprised of an apertured portions 31a formed in the lower sheet 31 and piece portions 32a formed on the upper sheet 32, and when the thick paper 5 such as a postcard with a photograph is placed, the piece portion 32a is inserted into the apertured portion 31a as indicated by arrow in FIG. 15 to bring about a state shown in FIG. 16, whereby the longitudinal deviation and the vertical spacing as viewed in the direction of conveyance of the upper and lower sheets can be prevented. Thus, no air layer is formed between the original and the sheet, and the thick paper such as a postcard with a photograph and the carrier sheet become substantially integral with each other and do not deviate relative to each other.

Figure 17:
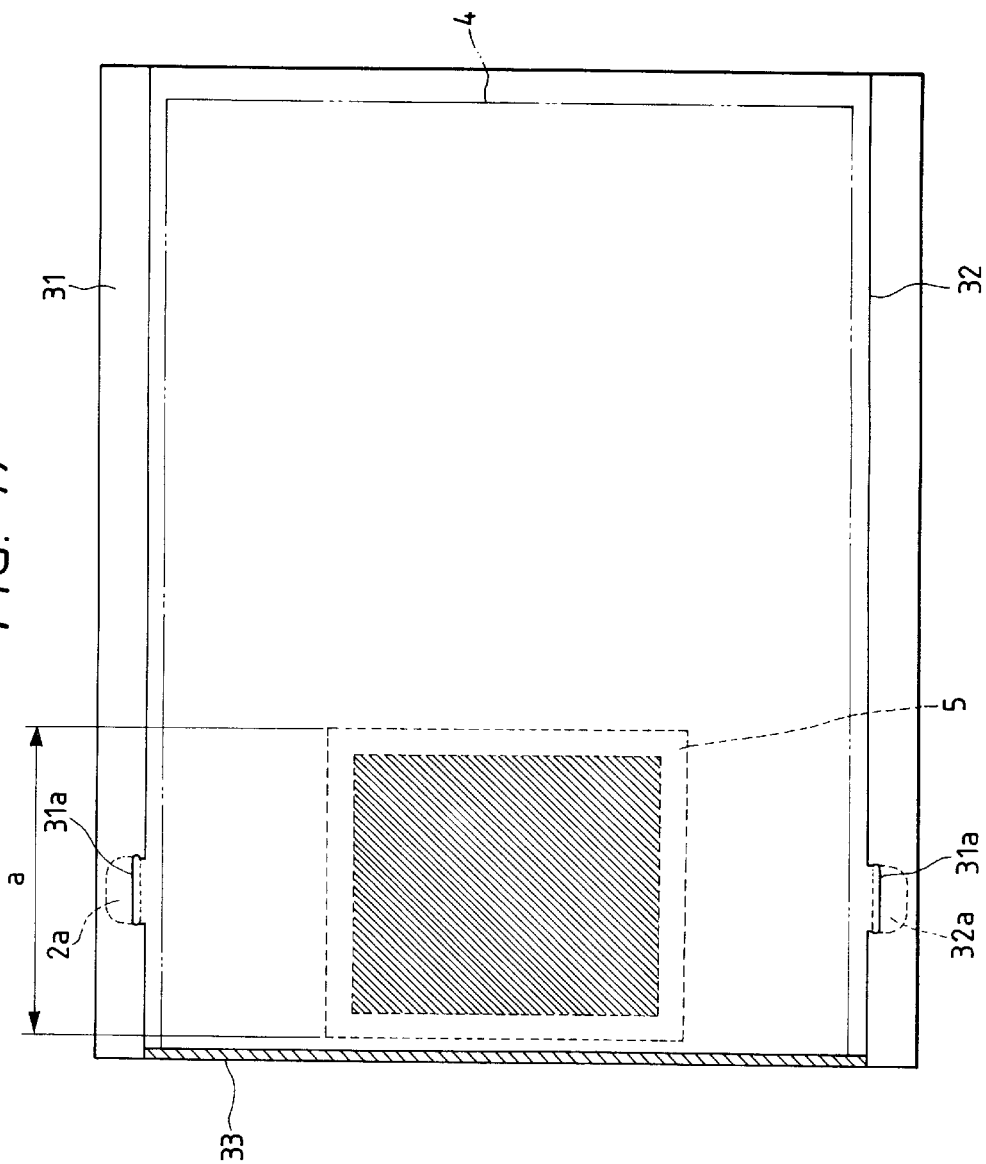
FIG. 17 is a plan view for illustrating a carrier sheet according to the fifth embodiment.
Figure 18:
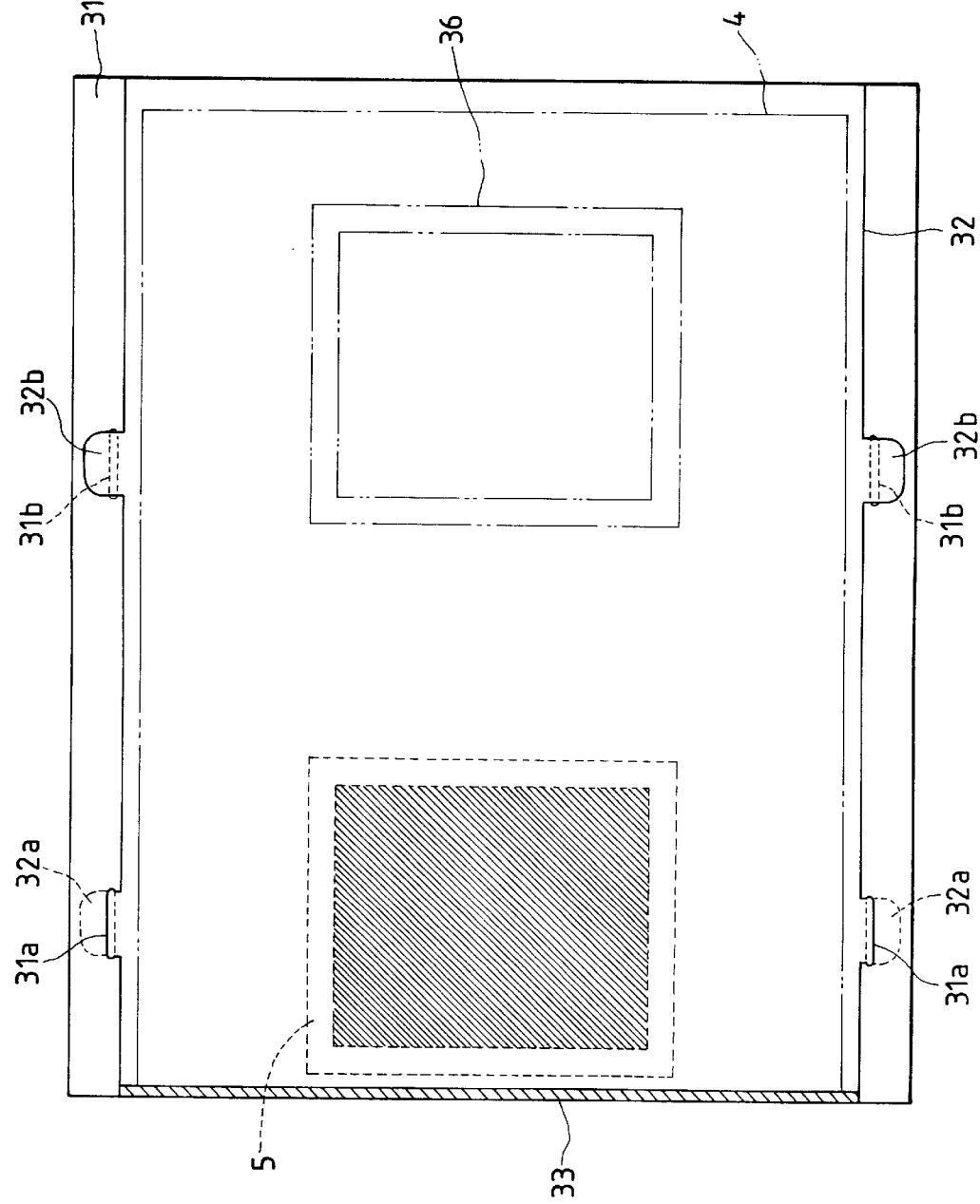
FIG. 18 is a plan view for illustrating a modification of the carrier sheet according to the fifth embodiment.

The restraining portion (31a, 32a) may preferably be disposed so that at least a portion thereof may overlap the range of the length in the longitudinal direction of the position at which the thick paper 5 such as a postcard with a photograph (original) is placed as viewed in the direction of conveyance, as shown in FIG. 17, and it is more effective to dispose it on the leading end side as viewed in the direction of conveyance. The size and shape of the restraining portion can be suitably determined if it is of such a shape that the upper and lower sheets can be temporarily made integral with each other. Also, when as shown in FIG. 18, the position at which the thick paper 5 such as a postcard with a photograph is placed is indefinite or plural, or when a thick paper original of a different size is used, the restraining portion can cope in any way by an apertured portion 31b and a piece portion 32b being further disposed as a second (or more) restraining portion.

Figure 19:
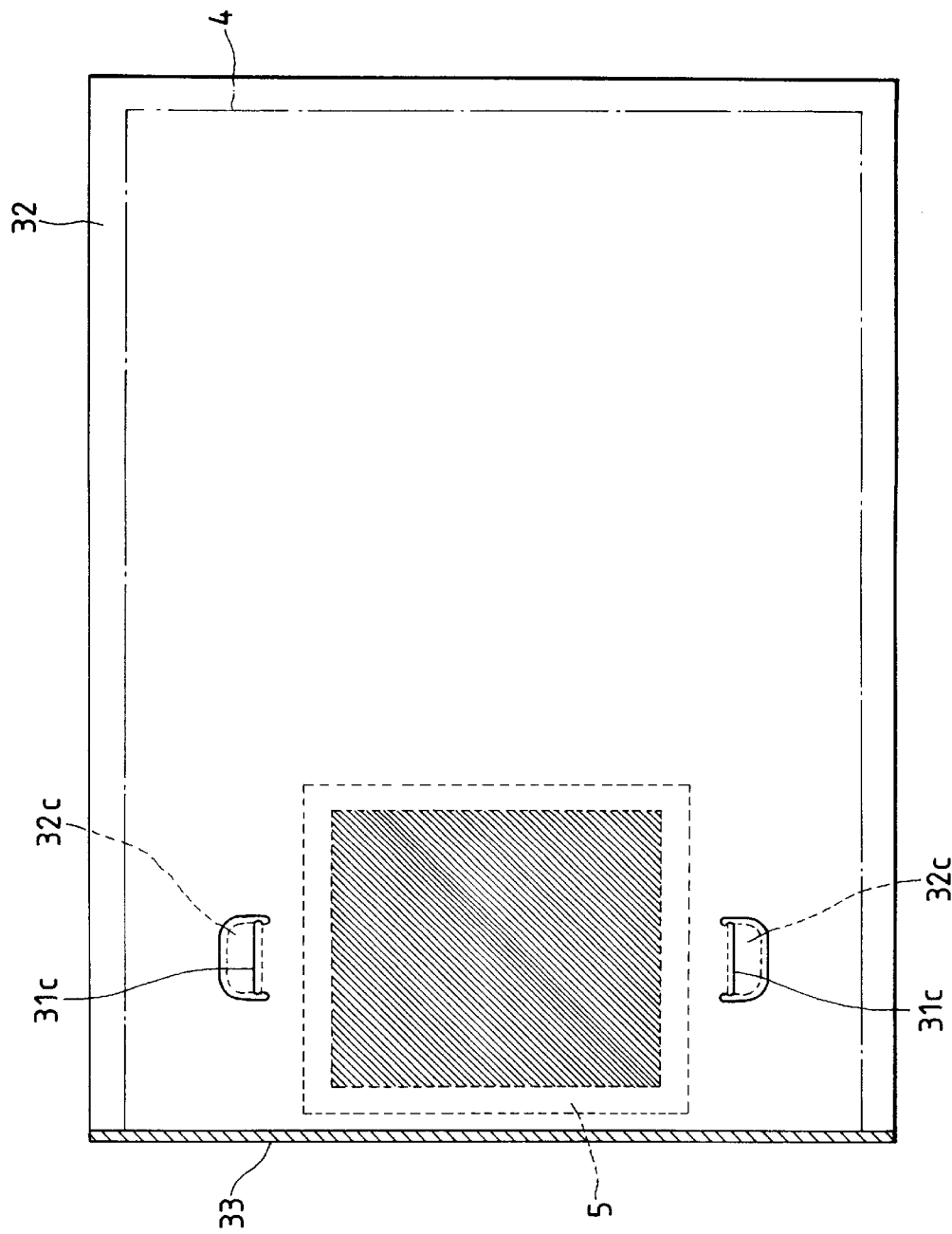
FIG. 19 is a plan view for illustrating another modification of the carrier sheet according to the fifth embodiment.

In the aforedescribed embodiment, the restraining portions have been described as being provided at the right and left sides of the position at which the thick paper original 5 such as a postcard with a photograph is placed as viewed in the direction of conveyance and outside the range in which the original 4 of a maximum size supposed is placed, but it is of course also possible to provide the restraining portion inside the range in which the original 4 of a maximum size supposed is placed, as shown in FIG. 19. In this case, depending on the original, the image portion and the piece portion 32a overlap each other, but since the upper sheet 32 is transparent, the shape thereof little effects the image read by the scanner apparatus. Also, the apertured portion and the piece portion are described as being provided in the lower sheet and the upper sheet, respectively, but, of course, the piece portion and the apertured portion may be provided in the lower sheet and the upper sheet, respectively, to obtain a similar effect.

[Sixth Embodiment]

A sixth embodiment of the carrier sheet according to the present invention will now be described with reference to FIG. 20. However, the scanner apparatus, the carrier sheet, etc. which duplicate the first embodiment and have the same reference numerals as those in the first embodiment need not be described.

Figure 20:
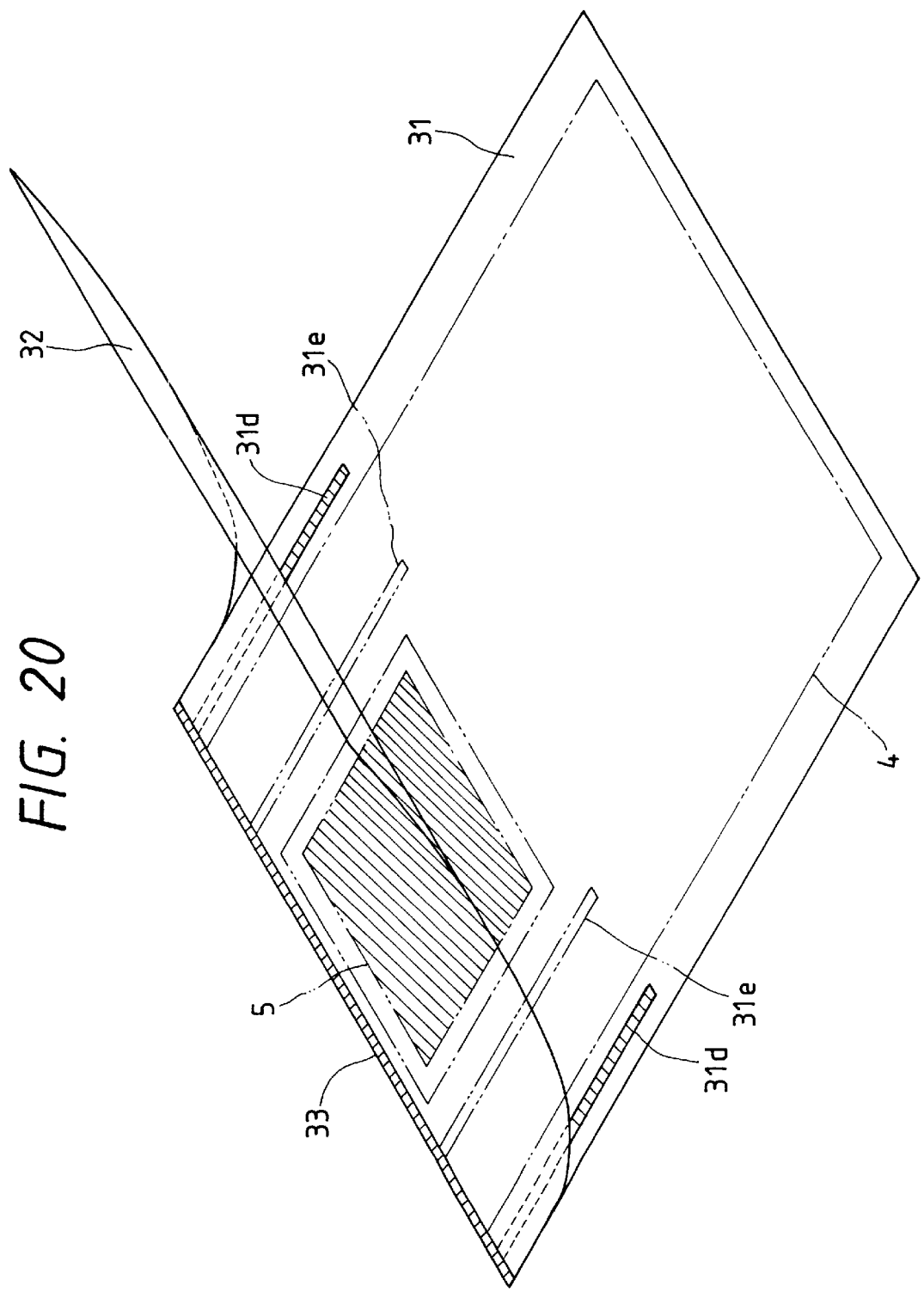
FIG. 20 is a pictorial perspective view for illustrating a carrier sheet according to a sixth embodiment.
Figure 21:
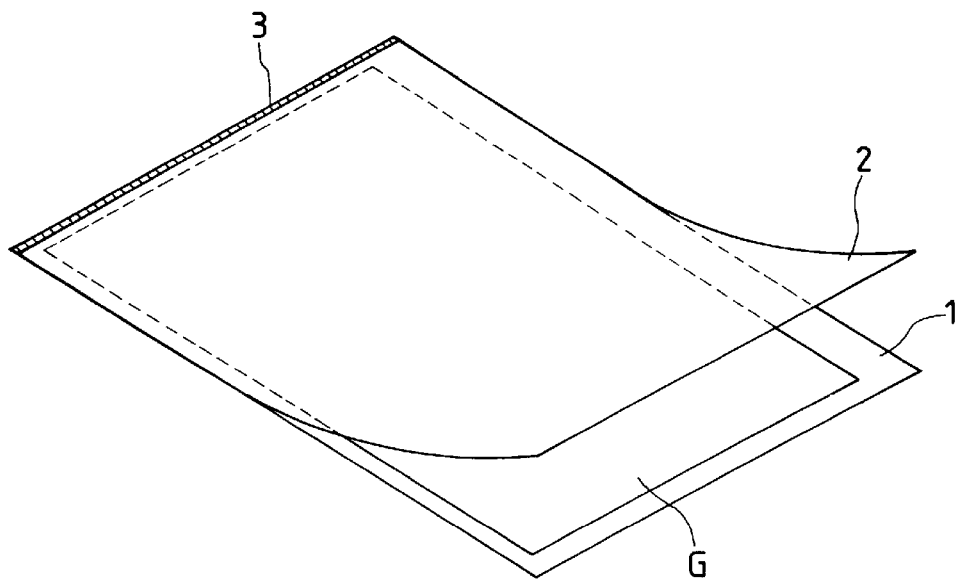
FIG. 21 is a pictorial view of a carrier sheet according to the prior art.

In FIG. 20, the reference character 31d designates tacky layers which can be repetitively stuck and peeled and which provide stopper portions for temporarily making the lower sheet 31 and the upper sheet 32 integral with each other to thereby prevent the deviation or spacing therebetween, at the right and left side of a position at which thick paper 5 such as a postcard with a photograph is placed as viewed in the direction of conveyance and outside a range in which an original 4 of a maximum size supposed is placed. The tacky portions 31d are applied or adhesively secured to the lower sheet 31, and they adhesively secure the lower sheet 31 to the upper sheet 32 and thereby temporarily make them integral with each other when the lower sheet 31 and the upper sheet 32 are put together with the original interposed therebetween. When the original is to be taken out, the upper sheet 32 can be easily peeled. Accordingly, during the conveyance of the original, the lower sheet 31 and the upper sheet 32 are temporarily adhesively secured to each other and made integral with each other to thereby prevent the deviation or spacing between the upper and lower sheets, and no air layer is formed between the original and the sheet. Therefore, the thick paper such as a postcard with a photograph and the carrier sheet become substantially integral with each other and do not deviate relative to each other.

Also, the tacky portions 31a, like those shown in FIG. 17, may preferably be disposed so that at least a portion thereof may overlap the range of the length in the longitudinal direction of the position at which the thick paper 5 such as a postcard with a photograph (original) is placed as viewed in the direction of conveyance, and the area and adhering force thereof can be suitably determined if the upper and lower sheets can become sufficiently integral with each other during the conveyance of the thick paper 5 such as a postcard with a photograph. Also, when the position at which the thick paper 5 such as a postcard with a photograph is placed is indefinite or plural, or when a thick paper original of a different size is used, the tacky portions 31d can have their disposed locations and length suitably determined correspondingly thereto.

In the aforedescribed embodiment, the tacky portions have been described as being provided at the right and left side of the position at which the thick paper original 5 such as a postcard with a photograph is placed as viewed in the direction of conveyance and outside the range in which an original 4 of a maximum size supposed is placed, but as a matter of course, it is also possible to provide the tacky portion inside the range in which the original 4 of a maximum size supposed is placed, as indicated at 31e in FIG. 20. In this case, depending on the original, the range of placement and the tacky portions 31e overlap each other, but the tacky portions 31e are a tacky agent which can be re-peeled, and therefore they may little injure the original. Also, while the tacky portions have been described as being provided on the lower sheet, they may of course be provided on the upper sheet to obtain a similar effect. As the tacky portions, use may be made of a viscous material (paste) or fasteners (so-called magic fasteners).

As described above, according to the fifth or sixth embodiment of the present invention, the restraining portions or the tacky portions for temporarily making the upper and lower sheets constituting the carrier sheet integral with each other are provided to thereby prevent the deviation or spacing between the upper and lower sheets, whereby it becomes possible to prevent the slippage of a relatively thick paper original such as a postcard with a photograph and the carrier sheet. Accordingly, it is possible to eliminate the deviation between the original and the sheet which is liable to occur when the leading end portion of the thick paper original rushes into the roller, and to prevent the bad paper feeding resulting therefrom and improve the nipping property of the leading end portion of the thick paper original into the roller and make the reading of the original in the original reading apparatus smooth and also increase the kinds of originals which can be conveyed.

What is claimed is:

1. A carrier sheet for original reading in an original reading apparatus, comprising:
   an upper sheet and a lower sheet adhered to each other at leading ends thereof as viewed in an insert direction of an original and opened at trailing ends thereof to set the original therebetween and closed to hold the original therebetween; and
   original nipping means provided on at least one of said upper sheet and said lower sheet for preventing a shifting of the original held between said upper and lower sheets, said original nipping means comprising a plurality of thin string-like adhered portions extending from the adhered leading ends in a direction transverse thereto,
   wherein said plurality of thin string-like adhered portions are arranged so that the original can be set between two of said thin string-like adhered portions, and an oversized original having a size larger than the original can be set by abutting an end portion of the oversized original against ends of the plurality of thin string-like adhered portions.

2. A carrier sheet according to claim 1, wherein the upper sheet is transparent and the lower sheet is opaque.

3. A carrier sheet according to claim 1, wherein one end of the thin string-like adhered portions extends widthwise.

4. An original reading apparatus, comprising:
   an upper conveying roller and a lower conveying roller for conveying an original;
   reading means disposed downstream of said conveying rollers for reading an upper surface of the original;
   a carrier sheet for original reading by said reading means having an upper sheet and a lower sheet which are adhered to each other at leading ends thereof as viewed in an insert direction of an original, and opened at trailing ends thereof to set the original therebetween and closed to hold the original therebetween; and
   original nipping means provided on at least one of said upper sheet and said lower sheet for preventing a shifting of the original held between said upper and lower sheets, said original nipping means comprising a plurality of thin string-like adhered portions extending from the adhered leading ends in a direction transverse thereto,
   wherein said plurality of thin string-like adhered portions are arranged so that the original can be set between two of said thin string-like adhered portions, and an oversized original having a size larger than the original can be set by abutting an end of the oversized original against ends of the plurality of thin string-like adhered portions.

5. An original reading apparatus, comprising:
   an upper conveying roller and a lower conveying roller for conveying an original;
   reading means disposed downstream of said upper and lower conveying rollers for reading the upper surface of the original;
   a carrier sheet for original reading by said reading means having an upper sheet and a lower sheet which are adhered to each other at leading ends thereof as viewed in an insert direction of an original, and opened at trailing ends thereof to set the original therebetween and closed to hold the original therebetween; and
   an engagement portion provided on at least one of said upper sheet and said lower sheet for preventing a shifting of the original held between the upper and lower sheets and for temporarily making the upper and lower sheets substantially integral with each other, wherein said engagement portion is comprised of a projected portion provided on one of said upper sheet and said lower sheet, and
   a portion for receiving said projection portion provided on the other of said upper sheet and said lower sheet at a position corresponding to said projected portion.

6. A carrier sheet for original reading in an original reading apparatus, comprising:
   an upper sheet and a lower sheet adhered to each other at leading ends thereof as viewed in an insert direction of an original and opened at trailing ends thereof to set the original therebetween and closed to hold the original therebetween; and
   original nipping means provided on at least one of said upper sheet and said lower sheet for preventing a shifting of the original held between said upper and lower sheets, wherein said original nipping means includes an engagement portion for temporarily making said upper and lower sheets substantially integral with each other when said upper and lower sheets are used, said engagement portion comprised of a projected portion provided on one of said upper sheet and said lower sheet and a receiving portion provided on the other of said upper sheet and said lower sheet at a position corresponding to said projection portion,
   wherein the projected portion and the receiving portion are formed at plural positions in parallel with respect to the leading ends, and a shifting of originals having different sizes or a plurality of originals can be prevented by engaging the projected portion and the receiving portion at a position corresponding to the sizes or the number of the original to be inserted between said upper sheet and said lower sheet.

7. A carrier sheet according to claim 6, wherein said upper sheet is a transparent sheet and said lower sheet is an opaque sheet.

8. A carrier sheet according to claim 6, wherein said engagement portion is formed integrally with said upper sheet and said lower sheet.

9. A carrier sheet according to claim 6, wherein said engagement portion is disposed so that at least a part thereof may exist in the opposite side areas of a thick original such as a postcard with a photograph on said carrier sheet as viewed in the advance direction of the original.

10. A carrier sheet according to claim 6, wherein said engagement portion is disposed at an area of said upper sheet or said lower sheet other than an area in which an original of a maximum size to be used in said carrier sheet is placed.

* * * * *

UNITED STATES PATENT AND TRADEMARK OFFICE
CERTIFICATE OF CORRECTION

PATENT NO. : 6,043,866
DATED : March 28, 2000
INVENTOR(S): TSUTOMU KAWAI, ET AL.

It is certified that error appears in the above-identified patent and that said Letters Patent is hereby corrected as shown below:

COLUMN 2:

Line 18, "feeding" should read --keep from shifting--.
Line 21, "feeding" should read --keep from shifting--.

COLUMN 5:

Line 43, "FIG. 8, other" should read --FIG. 8. Various other--.

Signed and Sealed this

Twenty-fourth Day of April, 2001

Attest:

NICHOLAS P. GODICI

*Attesting Officer*     *Acting Director of the United States Patent and Trademark Office*